(12) United States Patent
El Haddad

(10) Patent No.: US 6,691,985 B1
(45) Date of Patent: Feb. 17, 2004

(54) ELECTRICAL WIRE PULLING APPARATUS

(76) Inventor: Georges M. El Haddad, 2604 Prospect Ave., La Crescenta, CA (US) 91214

( * ) Notice: Subject to any disclaimer, the term of this patent is extended or adjusted under 35 U.S.C. 154(b) by 0 days.

(21) Appl. No.: 10/463,150

(22) Filed: Jun. 18, 2003

(51) Int. Cl.[7] .................................................. H02G 1/08
(52) U.S. Cl. ....................... 254/134.3 FT; 254/134.3 R
(58) Field of Search ............................... 254/134.3 FT, 254/134.3 R, 134.4, 134.6

(56) References Cited

U.S. PATENT DOCUMENTS

| | | |
|---|---|---|
| 3,968,952 A | 7/1976 | Newell |
| 4,413,808 A | 11/1983 | Finkle |
| 4,456,225 A * | 6/1984 | Lucas ................. 254/134.3 FT |
| 4,899,988 A * | 2/1990 | Mills .......................... 254/292 |
| 4,917,362 A | 4/1990 | Wilson |
| 5,149,056 A | 9/1992 | Jones |
| 5,645,256 A * | 7/1997 | Thomas, II ............ 248/222.11 |
| 5,984,273 A | 11/1999 | Ray |
| 6,003,842 A * | 12/1999 | Hug ................... 254/134.3 FT |
| 6,257,808 B1 | 7/2001 | Groot |

* cited by examiner

Primary Examiner—Lee D. Wilson

(57) ABSTRACT

An electrical wire pulling apparatus for pulling for electrical cable into an electrical circuit housing includes an elongated member having a top end and a bottom end. An upper bracket is attached to the elongated member and is removably attachable to the housing. A lower bracket is attached to the elongated member. The lower bracket is removably attachable to the pair of side walls of the housing. A saddle is removably attached to the elongated member. A motor is removably positioned in the saddle. A shaft is attached to the motor and extends outwardly away from the saddle. The motor selectively rotates the shaft. The shaft is orientated generally perpendicular to the elongated member. Electrical cable may be extended through the aperture and attached to the shaft such that the cable is pulled through the aperture and wound on the shaft.

10 Claims, 5 Drawing Sheets

ELECTRICAL WIRE PULLING APPARATUS

BACKGROUND OF THE INVENTION

1. Field of the Invention

The present invention relates to wire pulling devices and more particularly pertains to a new wire pulling device for drawing electrical cable into an electrical conduit housing.

2. Description of the Prior Art

The use of wire pulling devices is known in the prior art. While these devices fulfill their respective, particular objectives and requirements, the need remains for a device that is easily fitted to any electrical conduit housing.

SUMMARY OF THE INVENTION

The present invention meets the needs presented above by providing an upper bracket and a lower bracket which are adjustable for fitting to any housing.

Another object of the present invention is to provide a new wire pulling device that allows the electrical wire to be run though the upper bracket for better control of the wire and to enhance the stability of the apparatus.

To this end, the present invention generally comprises a device pulling for electrical cable into an electrical circuit housing. The housing includes a peripheral wall having an inwardly extending peripheral flange. The peripheral wall includes an upper wall, a bottom wall and a pair of side walls. The upper wall of the housing has an aperture extending therethrough. The device includes an elongated member having a top end and a bottom end. An upper bracket is attached to the elongated member and is removably attachable to the upper wall. A lower bracket is attached to the elongated member. The lower bracket is removably attachable to the pair of side walls. A saddle is removably attached to the elongated member. A pair of fasteners is removably extendable through the saddle and into the elongated member. A motor is removably positioned in the saddle. A shaft is attached to the motor and extends outwardly away from the saddle. The motor selectively rotates the shaft. The shaft is orientated generally perpendicular to the elongated member. Electrical cable may be extended through the aperture and attached to the shaft such that the cable is pulled through the aperture and wound on the shaft.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
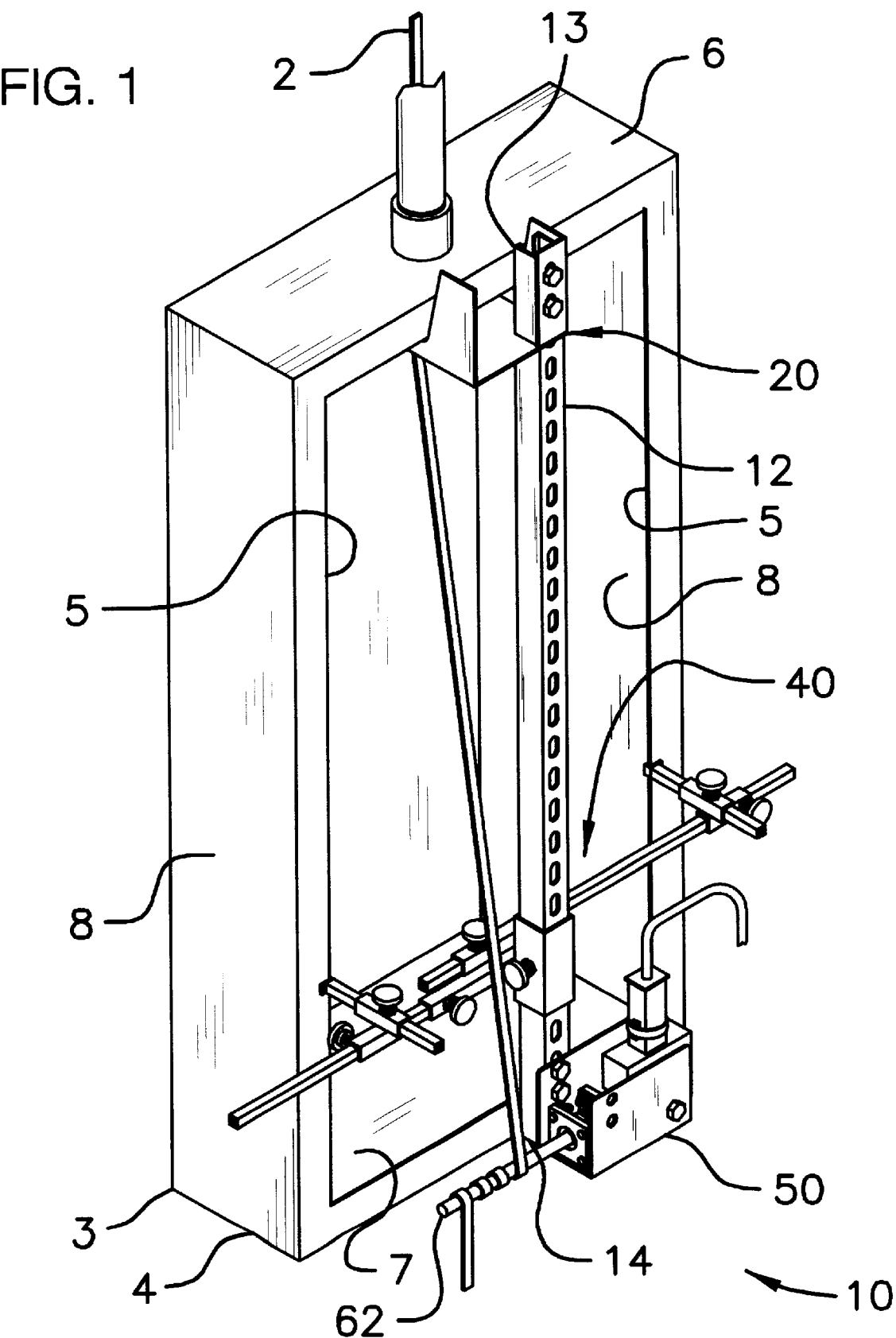
FIG. 1 is a schematic perspective view of an electrical wire pulling apparatus according to the present invention.
Figure 2:
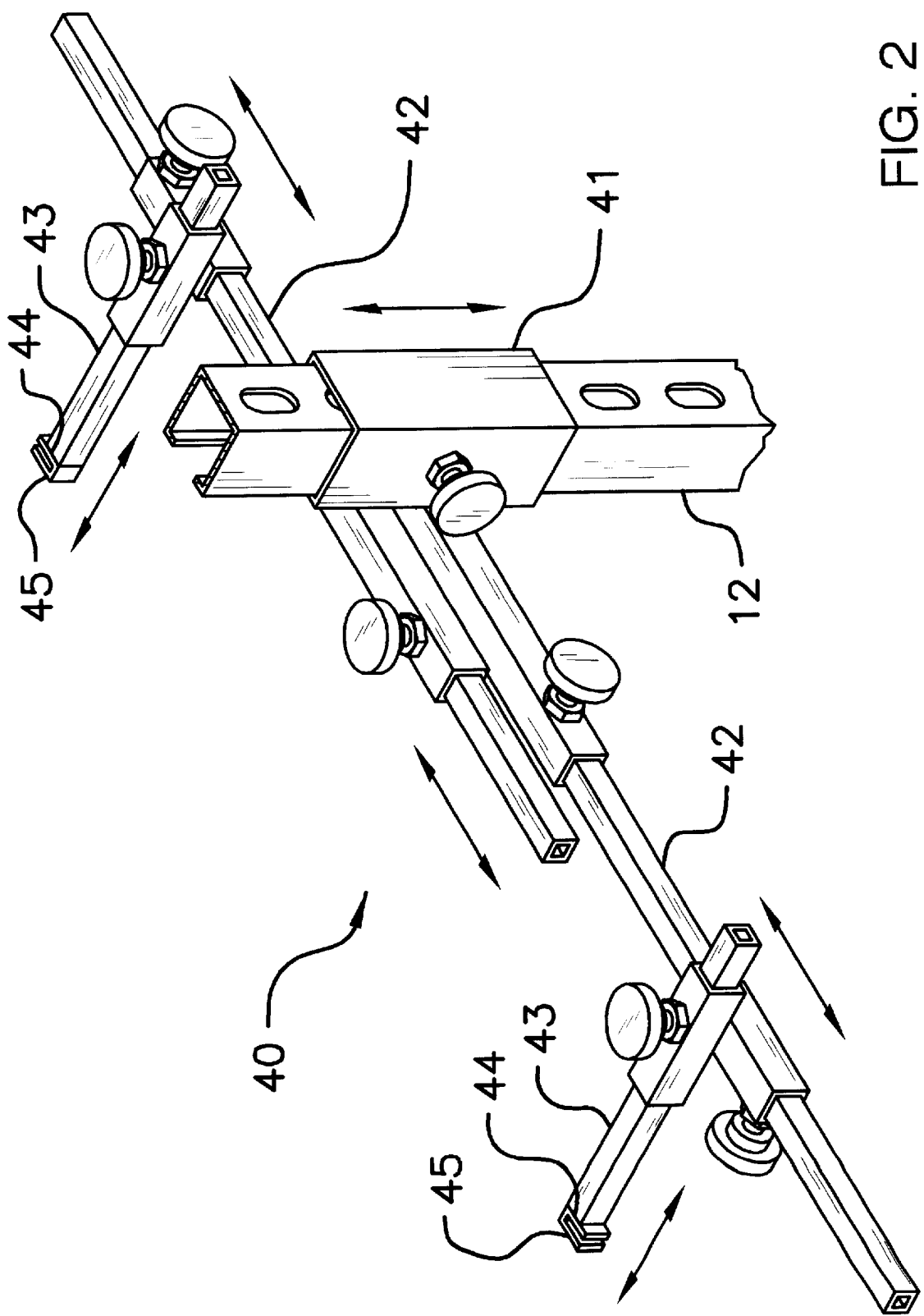
FIG. 2 is a schematic perspective view of the lower bracket present invention.
Figure 3:
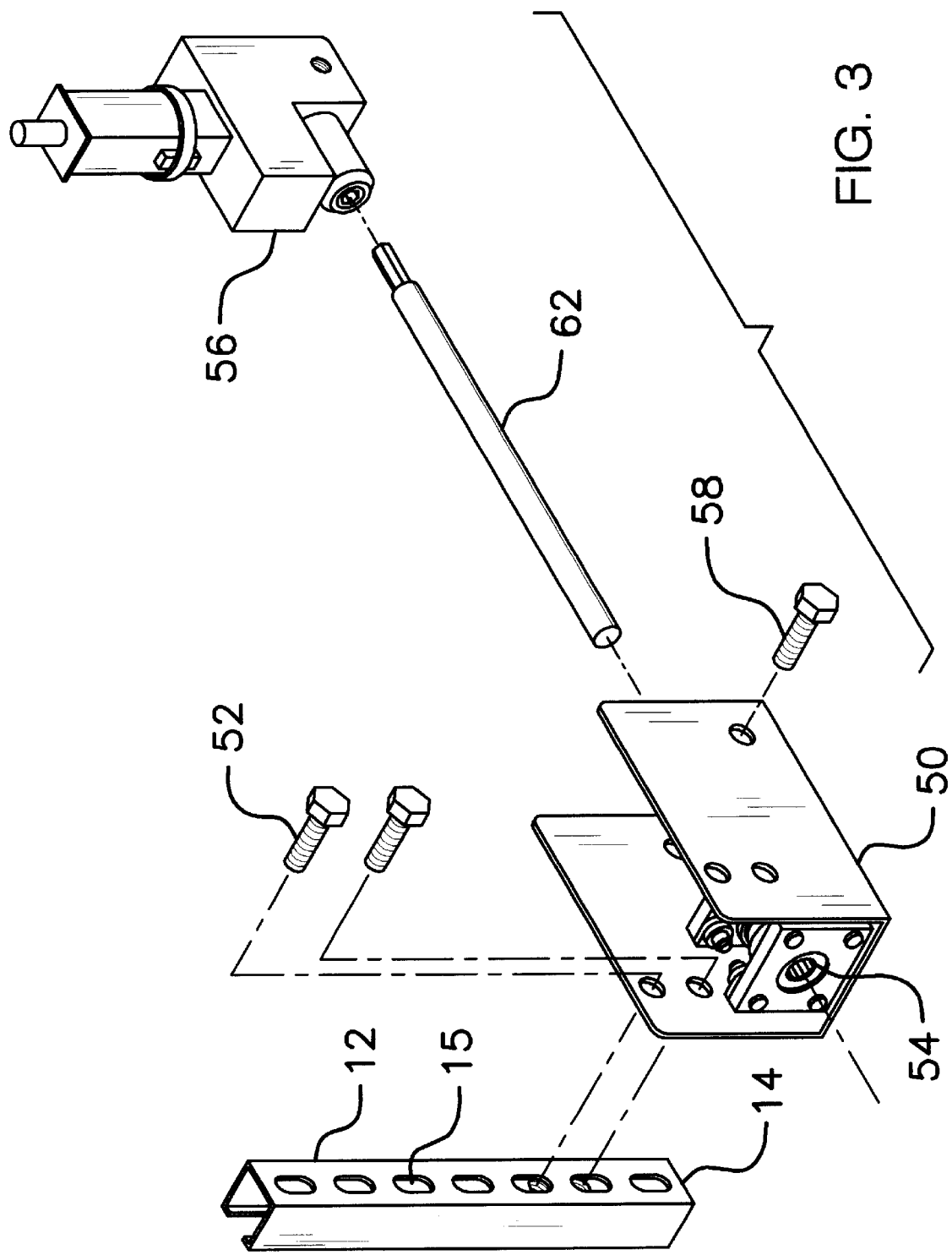
FIG. 3 is a schematic perspective view of the saddle of the present invention.
Figure 4:
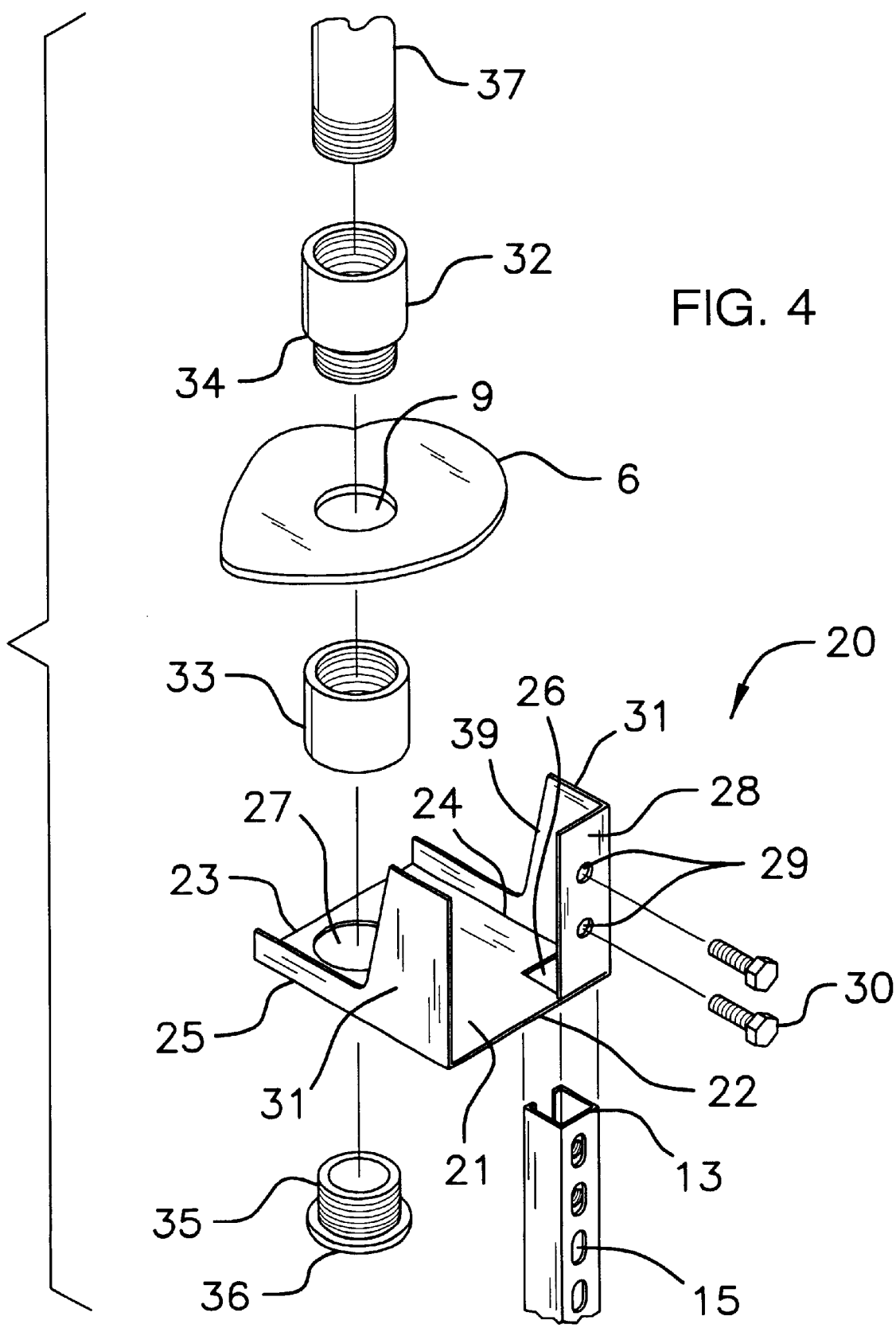
FIG. 4 is a schematic perspective view of the upper bracket present invention.
Figure 5:
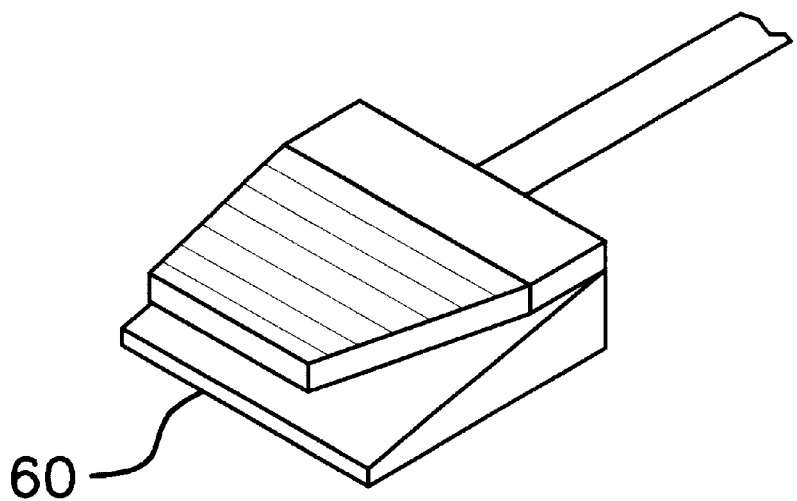
FIG. 5 is a schematic perspective view of the actuator of the present invention.
Figure 6:
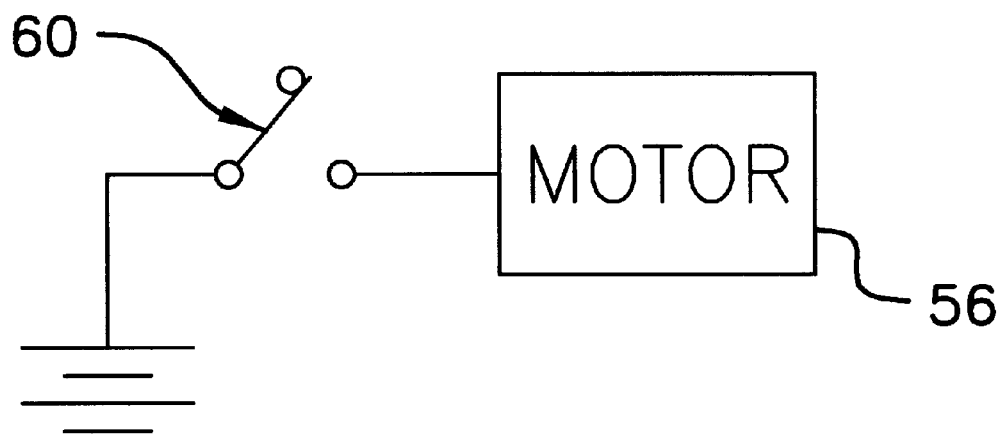
FIG. 6 is an electronic schematic view of the present invention.

With reference now to the drawings, and in particular to FIGS. 1 through 6 thereof, a new wire pulling device embodying the principles and concepts of the present invention and generally designated by the reference numeral 10 will be described.

As best illustrated in FIGS. 1 through 6, the electrical wire pulling apparatus 10 generally comprises a device for pulling for electrical cable 2 into an electrical circuit housing 3. The housing 3 includes a peripheral wall 4 having an inwardly extending peripheral flange 5. The peripheral wall 4 includes an upper wall 6, a bottom wall 7 and a pair of side walls 8. The upper wall 6 of the housing 3 has an aperture 9 extending therethrough. The apparatus 10 is removably mountable on the housing 3.

The apparatus 10 includes an elongated member 12 having a top end 13 and a bottom end 14. The apparatus 10 preferably has a plurality of slots 15 or openings extending therein.

An upper bracket 20 is attached to the elongated member 12 and is removably attachable to the upper wall 6 for mounting the elongated member 12 on the housing 3. The upper bracket 20 is selectively positionable on the elongated member 12. The upper bracket 20 includes a panel 21 having a first edge 22, a second edge 23, a third edge 24 and a fourth edge 25. The first 22 and second 23 edges are positioned opposite of each other. The panel 21 has a first opening 26 extending therethrough and positioned adjacent to the first edge 22 for receiving the elongated member 12. The panel 21 has a second opening 27 extending therethrough which is selectively alignable with the aperture 9 in the upper wall 6. The second opening 27 is positioned generally adjacent to the second edge 23. A wall 28 is attached to and extends upwardly from the first edge 22. The wall 28 has a pair of holes 29 extending therethrough. Each of a pair of fasteners 30 is removably extendable through one of the holes 29 and into the slots 15 of the elongated member 12. Each of a pair of guides 31 is attached to and extends upwardly from one of the third 24 and fourth 25 edges. Each of the guides 31 is positioned adjacent to the first edge 22. The guides 31 abut an outer edge of the upper wall 6 when the second opening 27 is aligned with the aperture 9. The guides 31 have an inner edge 39 facing the housing 3 that is angled back from the panel 21 to an upper edge of the guides 31.

A coupling member is removably extendably through the aperture 9 and through the second opening 27 for removably coupling the panel 21 to the upper wall 6. The coupling member preferably includes a first male member 32 that is extendable through the aperture 9. A female member 33 is positioned in the housing 3 and is coupled to the first male member 32 such that the upper wall 6 of the housing 3 is abutting a ridge 34 on the first male member 32. A second male member 35 is extended upwardly through the second opening 27 in the panel 21 and is coupled to the female member 32. A ridge 36 on the second male member 35 holds the panel 21 in position. A conduit 37 carrying the electrical wires 2 may be attached to the first male member 32.

A lower bracket 40 is attached to the elongated member 12. The lower bracket 40 is removably attachable to the pair of side walls 8 of the housing 3. The lower bracket 40 is selectively positionable on the elongated member. The lower bracket 40 includes a sleeve 41. The elongated member 12 extends through the sleeve 41. A securing member 42 extends through sleeve 41 for selectively securing the sleeve 41 to the elongated member 12. A pair of rods 42 is attached to the sleeve 41. The rods 42 extend in opposite directions with respect to each other and each of the rods 42 is orientated perpendicular to the elongated member when the sleeve 41 is positioned on the elongated member 12. The rods 42 are each preferably telescopic. Each of a pair arms 43 is attached to one of the rods 42. Each of the arms 43 extends in substantially the same direction. The arms 43 are each orientated substantially perpendicular to the rods 42. The arms 43 each have a free end 44. Preferably, each of the arms 43 is selectively extendable and retractable with respect to the rods 42. Each of a pair of clips 45 is attached to one of the free ends 44 of the arms 43. Each of the clips 45 is removably attachable to the flange 5.

A saddle 50 is removably attached to the elongated member 12. A pair of fasteners 52 is removably extendable through the saddle 50 and into slots 15 in the elongated member 12. A bushing 54 is preferably mounted in the saddle 50.

A motor 56 is removably positioned in the saddle 50. The motor 56 may be an electric drill which is removably positioned in the saddle 50. A securing member 58 may be extended through the saddle 50 and into the drill, or motor 56, for securing it in place. An actuator 60 is operationally coupled to the motor 56 for selectively turning the motor 56 on or off. The actuator 60 is preferably a foot operated actuator, such as a pedal. In the case of using a drill, the power switch 62 of the drill would be fixed in an on position and the actuator 60 would be electrically coupled to the drill for selectively supplying electricity to the drill.

A shaft 62 is attached to the motor 56 and extends outwardly away from the saddle 50. The motor 56 selectively rotates the shaft 62. The shaft 62 is orientated generally perpendicular to the elongated member 12. The shaft 62 extends through the bushing 54 for stability.

In use, electrical cable 2 is extended through the aperture 9 and attached to the shaft 62. The shaft 62 is rotated and the electrical cable 2 is pulled through the aperture 9 and wound on the shaft 62. The apparatus 10 may also be used to pull on a tether which is attached to the electrical cable 2 for drawing the electrical cable 2 through a dwelling and into the housing 3. The upper 20 and lower 40 brackets are adjustable for ensuring that they fit any electrical box or housing 3.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:
1. A wire puller device pulling for electrical cable into an electrical circuit housing, the housing including a peripheral wall having an inwardly extending peripheral flange, the peripheral wall including an upper wall, a bottom wall and a pair of side walls, the upper wall of the housing having an aperture extending therethrough, said device including:

an elongated member having a top end and a bottom end;

an upper bracket being attached to said elongated member, said upper bracket being removably attachable to the upper wall;

a lower bracket being attached to said elongated member, said lower bracket being removably attachable to the pair of side walls;

a saddle being removably attached to the elongated member, a pair of fasteners being removably extendable through said saddle and into said elongated member;

a motor being removably positioned in said saddle; and a shaft being attached to said motor and extending outwardly away from said saddle, wherein said motor selectively rotates said shaft, said shaft being orientated generally perpendicular to said elongated member, wherein electrical cable may be extended through said aperture and attached to said shaft such that said cable is pulled through said aperture and wound on said shaft.

2. The wire puller device of claim 1, wherein said upper bracket includes:

a panel, said panel having a first opening extending therethrough for receiving said elongated member, said panel having a second opening extending therethrough and being selectively alignable with the aperture in the upper wall;

a wall being attached to and extending upwardly from said panel, said wall having a pair of holes extending therethrough, each of a pair of fasteners being removably extendable through one of said holes and into said elongated member; and a coupling member being removably extendably through the aperture and through the second opening for removably coupling said panel to the upper wall.

3. The wire puller device of claim 2, wherein said panel has a first edge, a second edge, a third edge and a fourth edge wherein said first and second edges are positioned opposite of each other, said first opening being positioned adjacent to said first edge, said second opening being positioned adjacent to said second edge, each of a pair of guides being attached to and extending upwardly from one of said third and fourth edges, each of said guides being positioned adjacent to said first edge, wherein said guides abut an outer edge of the upper wall when said second opening is aligned with the aperture.

4. The wire puller device of claim 3, wherein said lower bracket includes:

a sleeve, said elongated member extending through said sleeve, a securing member extending through sleeve for selectively securing said sleeve to said elongated member;

a pair of rods being attached to said sleeve, said rods extending in opposite directions with respect to each other, each of said rods being orientated perpendicular to said elongated member when said sleeve is positioned on said elongated member;

a pair arms, each of said arms being attached to one of said rods, each of said arms extending in substantially the same direction, each of said arms having a free end, each of said arms being orientated substantially perpendicular to said rods; and a pair of clips, each of said clips being attached to one of said free ends of said arms, each of said clips being removably attachable to the flange.

5. The wire puller device of claim 4, wherein each of said rods are telescopic, each of said arms being selectively extendable and retractable with respect to said rods.

6. The wire puller device of claim 1, further including a bushing being mounted in said saddle, said shaft extending through said bushing.

7. The wire puller device of claim 1, further including an actuator being operationally coupled to said motor for selectively turning said motor on or off.

8. The wire puller device of claim 7, wherein said actuator includes a foot actuated actuator.

9. The wire puller device of claim 1, wherein said lower bracket includes:

a sleeve, said elongated member extending through said sleeve, a securing member extending through sleeve for selectively securing said sleeve to said elongated member;

a pair of rods being attached to said sleeve, said rods extending in opposite directions with respect to each other, each of said rods being orientated perpendicular to said elongated member when said sleeve is positioned on said elongated member;

a pair arms, each of said arms being attached to one of said rods, each of said arms extending in substantially the same direction, each of said arms having a free end, each of said arms being orientated substantially perpendicular to said rods; and a pair of clips, each of said clips being attached to one of said free ends of said arms, each of said clips being removably attachable to the flange.

10. The wire puller device of claim 9, wherein each of said rods are telescopic, each of said arms being selectively extendable and retractable with respect to said rods.

* * * * *